US008573599B2

(12) United States Patent
Wright

(10) Patent No.: US 8,573,599 B2

(45) Date of Patent: Nov. 5, 2013

(54) UNITARY HIGH PRESSURE SLIP SEAL CARTRIDGE

(75) Inventor: Douglas E. Wright, Durango, CO (US)

(73) Assignee: Stoneage, Inc., Durango, CO (US)

( * ) Notice: Subject to any disclaimer, the term of this patent is extended or adjusted under 35 U.S.C. 154(b) by 830 days.

(21) Appl. No.: 12/321,160

(22) Filed: Jan. 15, 2009

(65) Prior Publication Data

US 2009/0206557 A1 Aug. 20, 2009

Related U.S. Application Data

(60) Provisional application No. 61/011,342, filed on Jan. 15, 2008.

(51) Int. Cl.

| | |
|---|---|
| ***F16J 15/34*** | (2006.01) |
| ***B05B 3/06*** | (2006.01) |
| ***F16L 27/00*** | (2006.01) |

(52) U.S. Cl.

USPC ............ 277/371; 277/375; 239/259; 285/281

(58) Field of Classification Search

USPC ........... 277/371, 375; 285/281, 273; 239/259, 239/252, 256

See application file for complete search history.

(56) References Cited

U.S. PATENT DOCUMENTS

| | | | | |
|---|---|---|---|---|
| 3,002,769 | A * | 10/1961 | Deubler et al. | 285/39 |
| 3,649,056 | A * | 3/1972 | Frohlich et al. | 285/276 |
| 3,889,983 | A * | 6/1975 | Freize et al. | 285/13 |
| 3,899,199 | A * | 8/1975 | Garey | 285/27 |
| 4,576,387 | A * | 3/1986 | Ghilardi et al. | 277/581 |
| 4,606,560 | A * | 8/1986 | McCracken | 285/93 |
| 4,632,431 | A * | 12/1986 | McCracken | 285/13 |
| 4,817,995 | A * | 4/1989 | Deubler et al. | 285/98 |
| 5,015,016 | A * | 5/1991 | Smith, III | 285/108 |
| 5,087,082 | A * | 2/1992 | Anthonsen | 285/94 |
| 5,174,614 | A * | 12/1992 | Kalenìecki | 285/279 |
| 5,209,526 | A * | 5/1993 | Beccia et al. | 285/121.5 |
| 5,232,021 | A * | 8/1993 | Smith | 137/614.04 |
| 5,277,225 | A * | 1/1994 | Smith | 137/614.04 |
| 5,284,183 | A * | 2/1994 | Smith, III | 137/614.04 |
| 5,320,289 | A * | 6/1994 | Hashish et al. | 239/434 |
| 5,368,070 | A * | 11/1994 | Bosley | 137/614.04 |
| 5,379,938 | A * | 1/1995 | Perret, Jr. | 239/119 |
| 5,577,775 | A * | 11/1996 | Pearson et al. | 285/24 |
| 5,607,189 | A * | 3/1997 | Howeth | 285/39 |
| 5,669,636 | A * | 9/1997 | Kubala | 285/98 |
| 5,816,624 | A * | 10/1998 | Smith | 285/276 |
| 5,964,414 | A * | 10/1999 | Hardy et al. | 239/252 |
| 6,059,202 | A * | 5/2000 | Zink et al. | 239/259 |
| 6,202,691 | B1 * | 3/2001 | Smith, III | 137/614.04 |
| 6,702,198 | B2 * | 3/2004 | Tam et al. | 239/119 |
| 6,923,254 | B2 * | 8/2005 | Morrow et al. | 166/88.4 |
| 6,969,071 | B2 * | 11/2005 | Berard | 277/370 |
| 7,004,509 | B2 * | 2/2006 | Beach et al. | 285/281 |

(Continued)

*Primary Examiner* — Vishal Patel

*Assistant Examiner* — Nicholas L Foster

(74) *Attorney, Agent, or Firm* — Greenberg Traurig, LLP

(57) ABSTRACT

A unitary cartridge seal assembly for a high pressure liquid sealing connection between two relatively rotatable liquid passage members of a rotary nozzle or a swivel and a tool having such an assembly. The assembly comprises a thimble shaped or cylindrical housing having a flanged retainer fitting within an axial orifice to hold the components together while allowing sufficient axial movement to insure complete sealing of the respective elements. The assembly provides "drop-in" replacement of wearable parts of the rotary face seal of a high pressure water jet blasting tool.

6 Claims, 3 Drawing Sheets

(56) References Cited

U.S. PATENT DOCUMENTS

| | | | | |
|---|---|---|---|---|
| 7,303,194 | B2 * | 12/2007 | Smith, III | 277/647 |
| 7,416,224 | B2 * | 8/2008 | Ott | 285/121.1 |
| 7,464,750 | B2 * | 12/2008 | Schapel et al. | 166/84.1 |
| 7,600,700 | B2 * | 10/2009 | Trunick et al. | 239/251 |
| 2004/0012199 | A1 * | 1/2004 | Beach et al. | 285/272 |
| 2005/0206090 | A1 * | 9/2005 | Bunn | 277/549 |
| 2008/0092755 | A1 * | 4/2008 | Suter et al. | 99/495 |
| 2009/0206557 | A1 * | 8/2009 | Wright | 277/572 |

* cited by examiner

UNITARY HIGH PRESSURE SLIP SEAL CARTRIDGE

This application claims the benefit of provisional application No. 61/011,342 filed Jan. 15, 2008.

This invention relates to simplification of the replacement of wearing parts of seals between two relatively rotatable devices having connected high pressure liquid passages.

BACKGROUND OF THE INVENTION

In the field of high pressure rotary liquid handling devices operating parameters can exceed 10,000 psi, rotating speeds of 1,500 rpm and flow rates of 25 gpm. Accordingly the rotary seals required to work under such constraints generally require careful and precise assembly of the relative moving parts. An example of such a seal is shown in applicant's prior U.S. Pat. No. 6,059,202 (Zink et al) which is incorporated herein by reference.

Rotary face seals as used in such devices may incorporate numerous relatively small parts. While the mating portions of the rotating seals are relatively simple and inexpensive, they may require some degree of precision of assembly to function properly. Since these parts are subject to wear in use they require regular replacement as a part of normal maintenance. Such high pressure rotary cleaning tools are commonly used for cleaning or descaling of industrial equipment, for example boilers, where downtime of can result in substantial expense. Accordingly, the maintenance of the cleaning tools typically will take place in the field under less than pristine conditions and by unskilled personnel.

SUMMARY OF THE INVENTION

The present invention provides a cartridge assembly comprising the wearable parts of a rotary face seal for use in a high pressure rotary waterjet tool. The cartridge is positioned within and at the inlet end of the tool and is readily accessible and removable through the opening used to provide a supply of operating fluid. The seal cartridge is pre-assembled as a "drop-in" unit to facilitate routine maintenance yet provides for sufficient relative movement between components within the cartridge and between the cartridge and tool to insure complete sealing of the liquid path.

Among the objects of the invention is to simplify the replacement of wearing parts of a small high pressure spray nozzle seal to facilitate replacement of the wearable parts.

Another object of the invention is to minimize the time required to replace wearing parts of a rotary face seal in a high pressure waterjet tool.

Another object of the invention is to insure the accuracy of assembly of wearing parts when such parts are replaced in the field.

Another object of the invention is to provide a single assembly containing all the wearing parts for small diameter rotating high pressure spray nozzle.

Another object of the invention is to provide an inexpensive assembly containing all the wearing parts for small diameter rotating high pressure spray nozzle.

Another object of the invention is to provide simple access to all the wearing parts for small diameter rotating high pressure spray nozzle.

DESCRIPTION OF THE PREFERRED EMBODIMENT

Figure 1:
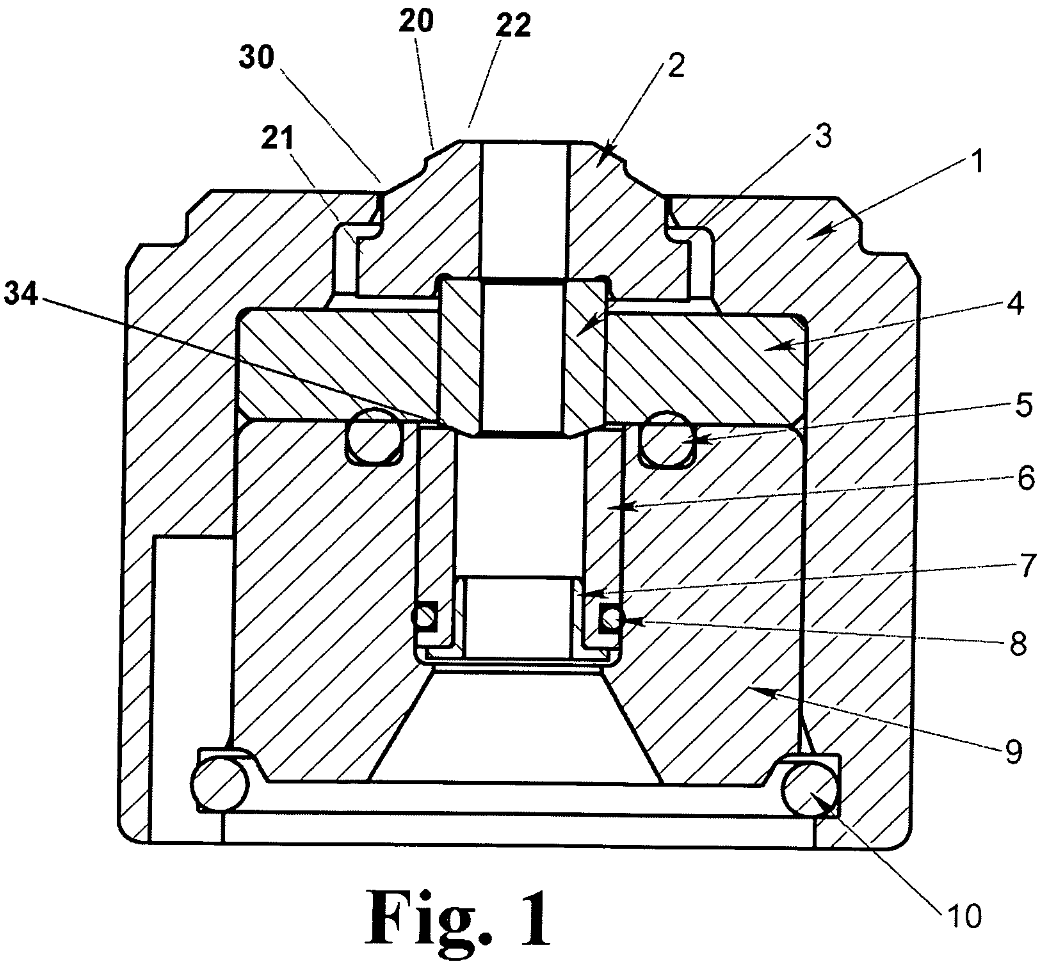
FIG. 1 is a cross sectional view of the high pressure face seal cartridge of the preferred embodiment.
Figure 2:
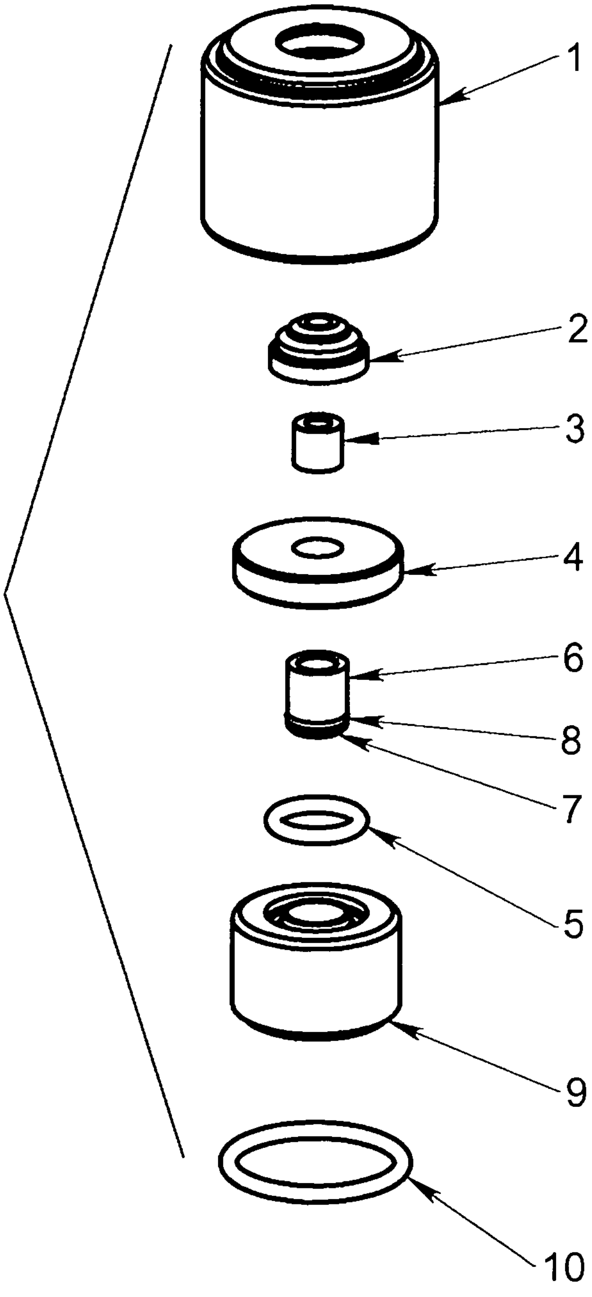
FIG. 2 is an exploded view of the components of the high pressure face seal cartridge of FIG. 1.
Figure 3:
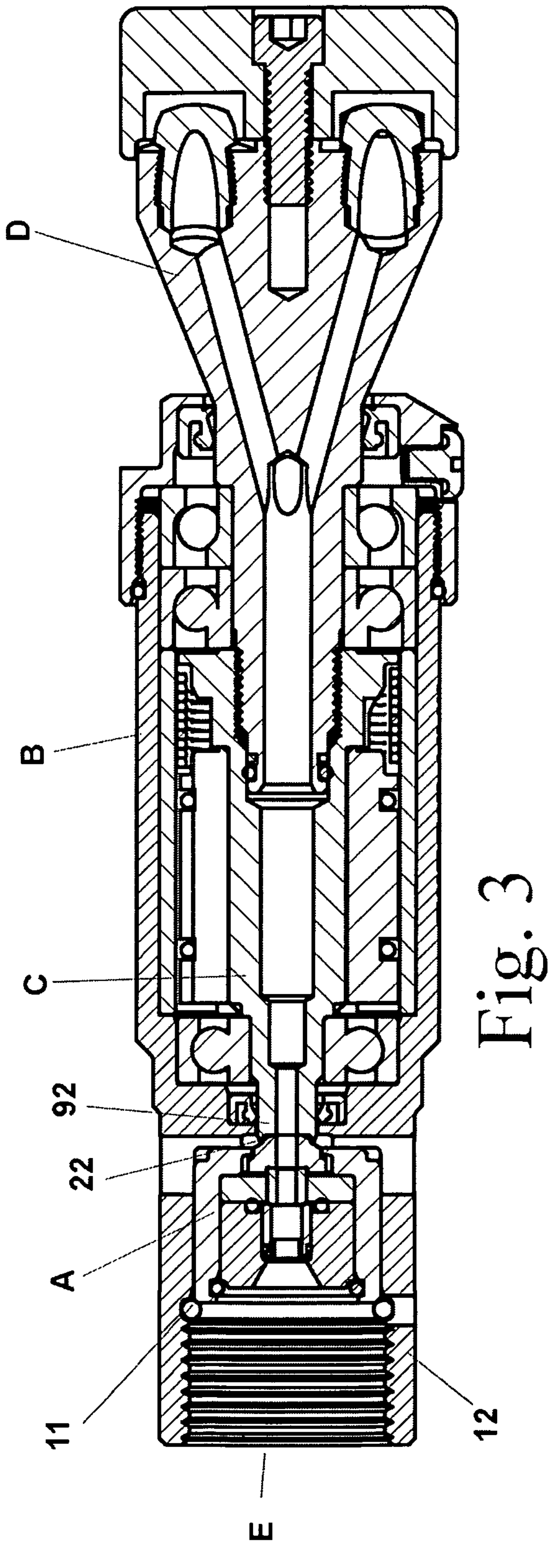
FIG. 3 is a cross sectional view showing the high pressure face seal cartridge of FIG. 1 in place in a representative high pressure rotary cleaning tool.

The cartridge assembly of the preferred embodiment as shown in FIG. 1 is adaptable to use in any high pressure rotary device having relatively rotatable elements such as the main body or housing B and shaft C shown in the representative tool of FIG. 3. The cartridge A is positioned within and at the inlet end of the tool and is readily accessible, insertable and removable through the axial opening E used to provide a supply of operating fluid. The seal cartridge A is held in place by retainer such as a simple O-ring 11 which provides simple retention of the cartridge when the tool is non-operational or detached from a source of operating fluid such as a hose or similar fluid line. Such a hose, when attached, is threaded into inlet nut 12 thereby fully securing the cartridge in place.

The seal assembly of the cartridge assembly A is contained within a generally thimble or cup-shaped outer housing 1 preferably machined of an appropriate grade of stainless steel or other similarly suitable material. A small diameter outer portion 20 of flanged seat cap 2 extends through an opening or orifice 30 in the housing 1. Orifice 30 has a diameter corresponding closely to the small diameter outer portion 20 of the seat cap 2. The diameter of inner flange portion 21 of cap 2 is larger than the diameter of orifice 30. Seat cap 2, having an external sealing face 22, is preferably formed from gall-resistant stainless steel to minimize problems resulting from some movement which may occur between the cap and the respective mating portion of the swivel tool shaft such as C in FIG. 3. The flanged configuration thereby allows the seat cap (a) to freely rotate within the housing 1 while retaining the integrity of the cartridge assembly A, particularly prior to the cartridge A being installed in the rotary tool, and (b) to have some limited axial movement to insure secure mating and sealing of the faces of the respective components which comprise the fluid path as described further below. The seat cap 2 is provided with a flat face 22 to seat against and mate with a corresponding face 92 on one end of a rotatable shaft such as that shown as C in FIG. 3. The flanged seat cap 2 receives an annular seat 3 which is made of tungsten carbide or similar wear resistant and durable material. Seat 3 provides a smooth straight chamfered end face at 34 where the relative rotary movement between seat 3 and seal 6 occurs. The annular seal 6 has an external diameter matching the inner cylindrical surface of inlet seat 9 and is made of an extrusion-resistant cross-linked ultra-high molecular weight polyethylene or other similar material having the characteristic of providing a relatively low-friction smooth seal surface at the interface 34 with seat 3. Seat 3 is rotatably retained within annular carbide seat retainer 4 having a central bore corresponding in diameter to the external diameter of seat 3. In use and under pressure of the operating fluid the outer surface of seal 6 is forced tightly against the inner diameter of inlet seat 9 and is further sealed by O-ring 8. The inner cylindrical surface of inlet seat 9 extends longitudinally over the entire length of seal 6.

A thimble shaped stainless steel seal support 7 fits within seal 6 to prevent any folding or undesirable deformation of seal 6. In use, a fluid supply is provided through a connector threaded into in the inlet end E of the exemplary tool shown in FIG. 3, also securely fixing the cartridge assembly A in place.

Thus seat cap 2, seat 3 and seal 6 are kept in close sealing contact to maintain the continuity of the path of flow of the operating fluid, O-ring 5 provides an annular seal between annular carbide seal retainer 4 and insert seat 9. Retention element, or O-ring 10 fits within a groove in the inner wall of housing 1 and abuts a face of inlet seat 9 to retain or hold all components in place within housing 1 when the swivel is not attached to a fluid supply.

The respective components seat cap 2, seat 3, seal 6 are each provided with a commonly sized axial bore corresponding to the axial bore of shaft C to conduct the high pressure operating fluid along the axis of the tool to the head D where the high pressure fluid is discharged through nozzles suitable for the intended application. As shown, seat cap 2 and seat 3 remain fixed with respect to one another and rotate in direct synchronization with shaft C while all other cartridge components remain fixed with respect to one another and with main body B. Accordingly as used herein, face sealing between respective components is "fixed" or "static" where the components have no intended relative movement. Where the components rotate relative to one another the seal is "movable," "rotatable" or "dynamic."

What I claim is:

1. A slip seal cartridge for use in a rotary high pressure fluid tool to seal between a tool housing and an axially rotating shaft within the housing, the cartridge comprising:

a cup shaped outer housing sized to be inserted within a rotary high pressure fluid tool housing, the cup shaped outer housing having a central axial opening therethrough;

a seat cap disposed in the cup shaped outer housing having an outer portion extending through the opening for contacting an axially rotating shaft in the fluid tool housing, and a flange portion retaining the seat cap in the outer housing, the seat cap having a central axial bore;

an annular seat axially aligned with and abutting the seat cap and carried within an annular seat retainer coaxially disposed in the outer housing;

an inlet seat in the outer housing axially aligned with and abutting the annular seat retainer;

an annular seal axially disposed within the inlet seat; and an annular retainer captured within the outer housing retaining the inlet seat, the annular seal, the annular seat, the annular seat retainer, and the seat cap axially aligned together in the outer housing, the annular retainer holding the inlet seat, the annular seal, the annular seat, the annular seat retainer, and the seat cap aligned together in the outer housing when the cartridge is not installed in the rotary high pressure fluid tool housing.

2. A slip seal cartridge for use in a rotary high pressure fluid tool to seal between a tool housing and a rotating shaft within the housing, the cartridge comprising:

a cup shaped outer housing sized to be inserted axially within a rotary high pressure fluid tool housing, the cup shaped outer housing having a central axial opening therethrough;

a seat cap disposed in the cup shaped outer housing having an outer portion extending through the opening for contacting an axially rotating shaft in the fluid tool housing, and a flange portion retaining the seat cap in the outer housing, the seat cap having a central axial bore;

an annular seat axially aligned with and abutting the seat cap and carried within an annular seat retainer coaxially disposed in the outer housing, the annular seat having a chamfered end face;

an inlet seat in the outer housing axially aligned with and abutting the annular seat retainer;

an annular seal axially disposed within the inlet seat; and an annular retainer captured within the outer housing retaining the inlet seat, the annular seal, the annular seat, the annular seat retainer, and the seat cap axially aligned together in the outer housing, the annular retainer holding the inlet seat, the annular seal, the annular seat, the annular seat retainer, and the seat cap aligned together in the outer housing when the cartridge is not installed in the rotary high pressure fluid tool housing.

3. The cartridge according to claim 2 further comprising a seal support disposed within the annular seal in the inlet seat.

4. The cartridge according to claim 3 wherein the seal support has an outer flange engaging a rear end of the annular seal.

5. The cartridge according to claim 2 wherein the annular seat has a straight chamfered end face abutting the annular seal.

6. The cartridge according to claim 2 wherein the annular retainer is an O-ring.

* * * * *

UNITED STATES PATENT AND TRADEMARK OFFICE

CERTIFICATE OF CORRECTION

PATENT NO. : 8,573,599 B2
APPLICATION NO. : 12/321160
DATED : November 5, 2013
INVENTOR(S) : Wright It is certified that error appears in the above-identified patent and that said Letters Patent is hereby corrected as shown below:

In the Specification

In Column 3, Line 3, delete "fluid," and insert -- fluid. --, therefor.

In Column 3, Line 4, delete "insert" and insert -- inlet --, therefor.

Signed and Sealed this
Twenty-second Day of July, 2014

Michelle K. Lee

Michelle K. Lee
*Deputy Director of the United States Patent and Trademark Office*